(No Model.)

J. G. McNAUGHTON.
BICYCLE ATTACHMENT.

No. 573,282. Patented Dec. 15, 1896.

WITNESSES:
Jos. A. Ryan
Edw. W. Byrn

INVENTOR
John G. McNaughton
BY Munn & Co.
ATTORNEYS.

UNITED STATES PATENT OFFICE.

JOHN GRELIS MCNAUGHTON, OF SALISBURY, NORTH CAROLINA, ASSIGNOR OF ONE-HALF TO LEO SHULTZ, OF SAME PLACE.

BICYCLE ATTACHMENT.

SPECIFICATION forming part of Letters Patent No. 573,282, dated December 15, 1896.

Application filed July 14, 1896. Serial No. 599,186. (No model.)

*To all whom it may concern:*

Be it known that I, JOHN GRELIS MCNAUGHTON, of Salisbury, in the county of Rowan and State of North Carolina, have invented a new and useful Improvement in Bicycle Attachments, of which the following is a specification.

The object of my invention is to provide a bicycle with means for preventing mud from being thrown by the rear wheel upon the rider and for protecting the skirts of a lady rider and preventing them from being blown about by the wind or being caught in the chain or wheel.

To these ends it consists in the peculiar construction and arrangement of devices hereinafter shown and described.

Figure 1:
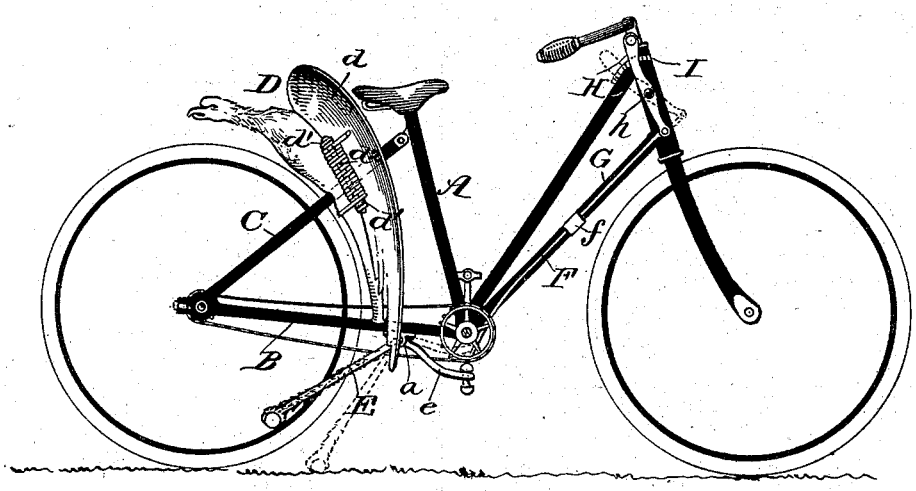
Figure 2:
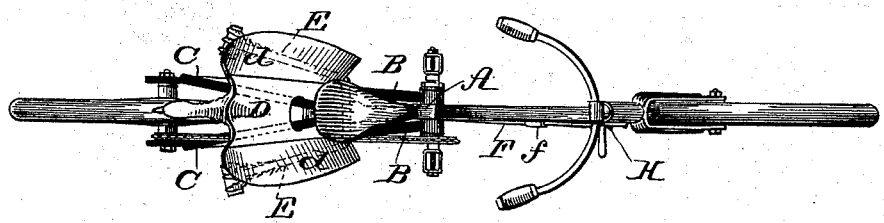
Figure 3:
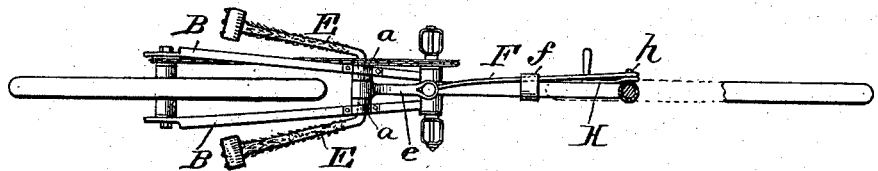

Figure 1 is a side elevation of a bicycle equipped with my improvement. Fig. 2 is a top plan view, and Fig. 3 an inverted plan view.

In the drawings, A represents the saddle-post or upright bar which sustains the saddle.

B B are the two bars of the main frame which connect the bearing of the rear axle to the bearings of the pedal-crank axle and are arranged, respectively, upon the opposite sides of the rear wheel.

C C are the two braces which extend from the bearing of the rear wheel up to the saddle-post near the saddle, these parts forming a sort of triangular frame, as is usual in bicycles, and to which my attachments are applied.

The mud-guard I preferably construct in the form of an eagle D, bending over the rear wheel, with his head pointing rearward and his wings extending outwardly on each side. This mud-guard is rigidly mounted upon the bars B B and braces C C, and the wings $d$ $d$ are hinged at $d'$ about an axis longitudinal to the body and are provided with springs $d^2$ to keep them distended but still allow them to fold inwardly, so that if the bicycle falls upon the side the wings will not be broken, but will yield inwardly. These wings are not intended for fanciful effect simply, but have the mechanical function of holding the skirts of a lady rider, protecting them from contact with the chain and wheel, thus dispensing with the ordinary network, and at the same time acting as a screen to hide her legs from view.

To the lower side of the bars B B, between the front edge of the rear wheel and just back of the crank-axle bearings, I attach an additional pair of bearings $a$, in which is hinged a pair of legs E E, made of one continuous bar bent so as to be U-shaped and having its middle portion hung within the bearings $a$ and its two extremities extending divergently toward the ground in rearward direction, one on each side of the rear wheel. These legs are preferably constructed in fanciful imitation of the eagle's legs and terminate in claws grasping bearing-blocks that are intended to come into contact with the ground and form feet that hold the bicycle upright when still and act as brakes on the ground in stopping the bicycle when in motion. To operate these legs E E so as to throw them into contact with the ground or up and away from the same, an elbow $e$ is rigidly attached to the legs at the middle point of their bend and between the bearings $a$ $a$. This elbow is loosely connected to a slide-rod F, that moves longitudinally through a keeper $f$, fastened to the main frame-bar G, and at its front end is jointed to the lower end of an upright hand-lever H, fulcrumed at $h$ to the vertical fork-tube, which lever moves over a stationary arc-bar I on said vertical fork-tube, so as to guide and, if necessary, to lock the hand-lever to its several positions.

When it is desired to arrest the motion of the bicycle and come to a standstill, the upper end of this hand-lever is grasped and pulled to the rear. This pulls forward the legs E E down into contact with the ground, as shown in dotted lines, and as they drag upon the ground they act as brakes to stop the momentum of the bicycle and bring the same to a standstill in an erect position, with the feet of the legs acting as supports on each side of the bicycle. The rider may then dismount, if desired, or remain seated. If the rider dismounts, the bicycle is left standing in this position, the hand-lever being locked on its arch-bar. To mount again, the rider, if a lady, regains the saddle without putting the feet upon the treadle until she is firmly seated and has her dress arranged, when the feet may be applied to the treadles, the hand-lever unlocked, the brake or supporting-legs lifted, and the bicycle started again from the action of the treadles.

Having thus described my invention, what I claim as new, and desire to secure by Letters Patent, is—

A mud-guard for a bicycle having hinged wings on each side to act as guards for a lady's skirt and a shield for the legs substantially as and for the purpose described.

JOHN GRELIS McNAUGHTON.

Witnesses:
J. M. McCORKLE,
W. H. CRAWFORD.